(12) United States Patent
McCleer et al.

(10) Patent No.: US 9,287,819 B2
(45) Date of Patent: Mar. 15, 2016

(54) SYSTEM AND METHOD FOR DETERMINING ROTOR SHAFT POSITION OF HIGH VOLTAGE PM AC SYNCHRONOUS MACHINES USING AUXILIARY WINDINGS

(71) Applicant: SKY WINDPOWER CORPORATION, San Rafael, CA (US)

(72) Inventors: Patrick J. McCleer, Holland, MI (US); Richard K. Mains, Grass Lake, MI (US)

(73) Assignee: SKY WINDPOWER CORPORATION, Oroville, CA (US)

( * ) Notice: Subject to any disclaimer, the term of this patent is extended or adjusted under 35 U.S.C. 154(b) by 2 days.

(21) Appl. No.: 14/217,644

(22) Filed: Mar. 18, 2014

(65) Prior Publication Data

US 2014/0265973 A1    Sep. 18, 2014

Related U.S. Application Data

(60) Provisional application No. 61/798,107, filed on Mar. 15, 2013.

(51) Int. Cl.
| | |
|---|---|
| *H02P 6/14* | (2006.01) |
| *H02P 27/06* | (2006.01) |
| *H02P 6/18* | (2006.01) |
| *H02P 6/20* | (2006.01) |
| *H02P 25/02* | (2006.01) |

(52) U.S. Cl.
CPC ............... *H02P 27/06* (2013.01); *H02P 6/181* (2013.01); *H02P 6/205* (2013.01); *H02P 25/023* (2013.01)

(58) Field of Classification Search
CPC .......... H02K 11/0073; H02K 11/0031; H02K 16/04; H02P 25/085; H02P 25/22; H02P 27/06; H02P 6/14
USPC ........ 318/400.42, 254.1, 491; 310/68 R, 109, 310/129, 144, 145, 146, 152, 254.1
See application file for complete search history.

(56) References Cited

U.S. PATENT DOCUMENTS

| | | | | |
|---|---|---|---|---|
| 5,329,195 | A * | 7/1994 | Horber et al. ............... 310/68 B |
| 5,838,122 | A * | 11/1998 | Vu ............................ 318/400.33 |
| 7,230,785 | B2 * | 6/2007 | Itagaki et al. .............. 360/73.03 |
| 7,304,446 | B2 * | 12/2007 | Wang et al. ................ 318/254.1 |
| 7,508,154 | B1 | 3/2009 | Labriola, II |
| 7,723,942 | B1 | 5/2010 | Labriola, II |
| 8,080,960 | B2 * | 12/2011 | Rozman et al. .......... 318/400.33 |
| 2004/0249596 | A1 | 12/2004 | Ho |
| 2010/0109584 | A1 | 5/2010 | Kwon et al. |
| 2010/0320763 | A1 | 12/2010 | Li et al. |
| 2011/0181220 | A1 | 7/2011 | Tamai et al. |
| 2012/0228981 | A1 | 9/2012 | Dajaku |

* cited by examiner

*Primary Examiner* — Bentsu Ro
*Assistant Examiner* — Thai Dinh
(74) *Attorney, Agent, or Firm* — Dowell & Dowell, PC

(57) ABSTRACT

A system and method for determining rotor shaft position of high voltage permanent magnet AC synchronous machines using auxiliary windings utilizes a permanent magnet AC synchronous motor including a stator having a main set of coils and an auxiliary set of coils. A drive controller including a digital signal processor in communication with the motor utilizes a current and voltage measurements from the main and auxiliary coils to determine the position of the rotor shaft in a sensorless mode.

5 Claims, 4 Drawing Sheets

SYSTEM AND METHOD FOR DETERMINING ROTOR SHAFT POSITION OF HIGH VOLTAGE PM AC SYNCHRONOUS MACHINES USING AUXILIARY WINDINGS

BACKGROUND OF THE INVENTION

1. Technical Field

The present invention pertains to the art of permanent magnet (PM) AC synchronous machines, and more particularly, to a system and method for determining rotor shaft position of a high voltage machine using auxiliary windings.

2. Background Art

There are a variety of known PM AC synchronous machines or motors on the market. One example of a known PM AC synchronous machine is depicted in FIG. 1. More specifically, FIG. 1 shows machine winding details as seen from an air gap, looking toward stator teeth 10 and winding slots, of a particular three phase prior art PM machine structure. The machine depicted is a 48 pole machine with two similar sets of three concentrated phase windings per pole pair. This type of machine construction is referred to as a ½ slot per pole per phase fractional slot winding machine. Thus the 48 pole machine has 72 stator teeth/slots. The windings 12 are said to be concentrated because each winding coil 12 is wrapped around a single tooth 10. There are two sets of 3-phase windings allowing for two 3-phase power electronic drives to power/control the machine. All phase A coil windings 12 in either winding set are connected in series such that the voltages induced by the rotor magnets in the phase A coils all "add" algebraically. The connections for the phase B and phase C coil windings are similar, all in series connection. For this particular machine the individual coils of the main or "power" windings, those with their external terminals connected to the power electronic drive, are wound with Nt=180 turns per coil 12. Each phase of either winding set then has twelve (12) series connected coils, for a total series number of turns of 2160 turns per phase. This high value of turns per phase is due to the fact that this particular machine is intended for high voltage operation, with thousands of volts between the phase winding sets. Note that the designations of α and β in FIG. 1 are used for identification purposes only, and these designations are not to be confused with reference to the use of Greek characters in the mathematical relationships described in the method of the present invention. FIG. 2 depicts a partial cross sectional view of the prior art machine of FIG. 1. More specifically, FIG. 2 shows stator teeth 10 extending from a stator lamination stack 14.

Standard operation of a PM AC synchronous machine requires that the machine stator winding currents must be time and spatially synchronized (in-phase) with the rotating position of the multi-pole magnets in the rotor structure. In essence, the multi-pole magnetic fields in the machine air gap due to the currents in the stator phase windings must rotate synchronously with like multi-pole magnetic fields in the air gap due to the rotor magnets. Therefore to drive or control the stator currents to obtain synchronous operation one must be able to determine instantaneous rotor position information. There are many ways to obtain rotor position information in a PM AC synchronous machine, but the most rugged and desirable measuring systems to obtain this information, particularly in harsh environments, do not utilize mechanical or optical measuring subsystems, rather, only simple voltage and current measuring instruments or transducers are employed. Such measurement and position sensing systems are commonly termed "sensorless" systems, even though they do utilize voltage and current "sensors."

It is well known in the electrical practice (see for example the textbook of Peter Vas, "Sensorless Vector and Direct Torque Control," Oxford University Press, 1998, particularly Section 3.1.3.2, pages 124 through 136) that the shaft position (the instantaneous rotor angle) of a multiphase PM AC synchronous machine can be determined by:

1) measuring the machine stator terminal voltages;
2) subtracting off winding resistive voltage components;
3) integrating the resultant voltages to obtain winding flux linkages;
4) forming equivalent two-phase winding flux linkages that are in time quadrature to each other; and
5) subtracting off equivalent two-phase winding inductive flux linkage components due to the equivalent two-phase stator winding currents.

The resultant set of two flux linkages, after operations 1) through 5), are in time quadrature to each other (sine and cosine function like time variation) and, more importantly, are the equivalent two-phase stator winding flux linkages due solely to the rotating array of rotor mounted magnets. Therefore the time variations of these two flux linkages, here referred to as psim_alpha and psim_beta, which vary in sine and cosine function fashion, as functions of the instantaneous rotor angular position, directly indicate the angular position of the set of rotor magnets. That is, if theta_m is the mechanical angular measure of the rotor with respect to a fixed point on the stator air gap surface, the variation of flux linkages psim_alpha and psim_beta will be in proportion to the functions $\sin(np^*(\text{theta\_m}+\text{theta\_mo})/2)$ and $\cos(np^*(\text{theta\_m}+\text{theta\_mo})/2)$, where np is the number of magnetic poles of the rotor structure and theta_o is a fixed angle offset determined by the reference point for theta_m on the stator air gap surface. One can determine theta_mo by inspection from the placement of the particular stator winding phase coils in the stator structure. For example it is common to assign the rotor mechanical position theta_m reference (value=0.0) as the angle at which the flux linkage due to the rotor magnets is maximum and positive in the a-phase set of stator coils. The flux linkage fundamental sinusoidal function component, due to the rotor magnets, then varies for the a-phase set of rotor windings as psim_a=M*cos(np*theta_m/2), where M is the peak magnitude of the coupled flux linkages (measured in Weber-turns). The flux linkages due to the rotor magnets in the other phase windings of the machine then follow in phase sequence, separated in angular variation by the angle np*delta_theta/2, where delta_theta is the mechanical angle between adjacent phase windings in the stator structure. If one can then extract the angular variation of the flux linkages due to the rotor magnets, then the angular variation of the rotor itself is then determined. This extraction process is best done not on the phase flux linkages themselves, but rather on the calculated equivalent two-phase flux linkages psim_alpha and psim_beta, which can take advantage of their true phase quadrature nature and a simple phase locked loop system which filters out measurement noise (from measurements of the phase winding currents and terminal voltages). As mentioned, the basic theory and practice of this method, or close variations of this method, for rotor angle estimation are well known in the art.

The rotor angle estimation system described above is hard, or at best expensive, to implement for very high voltage machines. Direct measurements of magnitudes and phases of very high voltages (thousands of volts) at machine terminals are not trivial. Even tapped coil voltage measurements are not trivial due to very high common mode voltages with reference to low voltage signal processing electronics. But it is still desirable to be able to utilize the rotor position estimation scheme described above even for very high voltage machines. Therefore, there is seen to be a need in the art for new systems and methods to indirectly determine the required high voltage coil flux linkages

SUMMARY OF THE INVENTION

The present invention is directed to a system and method for determining rotor shaft position of a high voltage permanent magnet (PM) AC synchronous machine using auxiliary windings. The present invention solves problems associated with the prior art described above using a simple, safe and accurate method to indirectly determine the required high voltage coil flux linkages. An auxiliary set of coils is wound in the PM machine stator, co-located with a main set of stator phase windings, one auxiliary coil for each main stator coil, each auxiliary coil wound in the same magnetic configuration (the same magnetic circuit) as it's mating main stator phase coil. If the main set of stator phase coils has Nt turns in each coil, and the auxiliary set of coils have Ntx turns per coil, where Nt>>Ntx, the magnitudes of the induced voltages in the very tightly coupled auxiliary windings (very near unity coupling transformer action) are in a ratio of Ntx/Nt, a very small value, which leads to safe and easily manipulated signal level voltages, which are in direct proportion and in-phase to the voltages in the main phase windings. The required winding insulation between the high voltage main windings and the low voltage auxiliary windings is easily implemented with common winding insulation materials. Thus the auxiliary coil set can be easily and safely constructed, requiring very little winding space due to the low number of conductor turns in the auxiliary coils. And there is a second beneficial use of the auxiliary winding set, which is to economically supply isolated, low voltage power supplies for powering the signal processing and drive control electronics at remote locations of the high voltage machines, by draining very small amounts of main winding set power. This power supply function in no way compromises the primary position sensing function of the auxiliary coils (as will be detailed below).

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
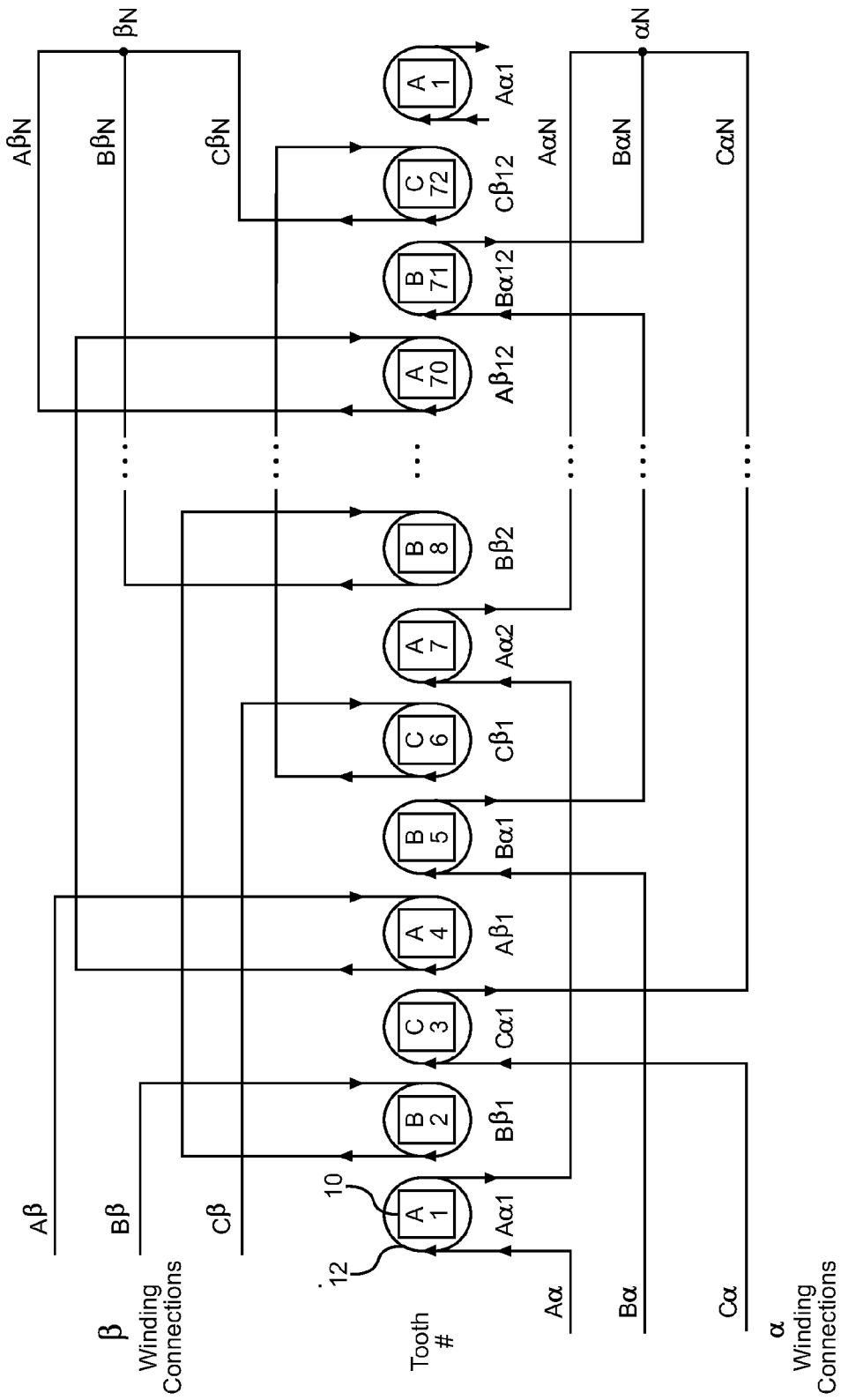
FIG. 1 is a prior art 3-phase permanent magnet (PM) machine structure.
Figure 2:
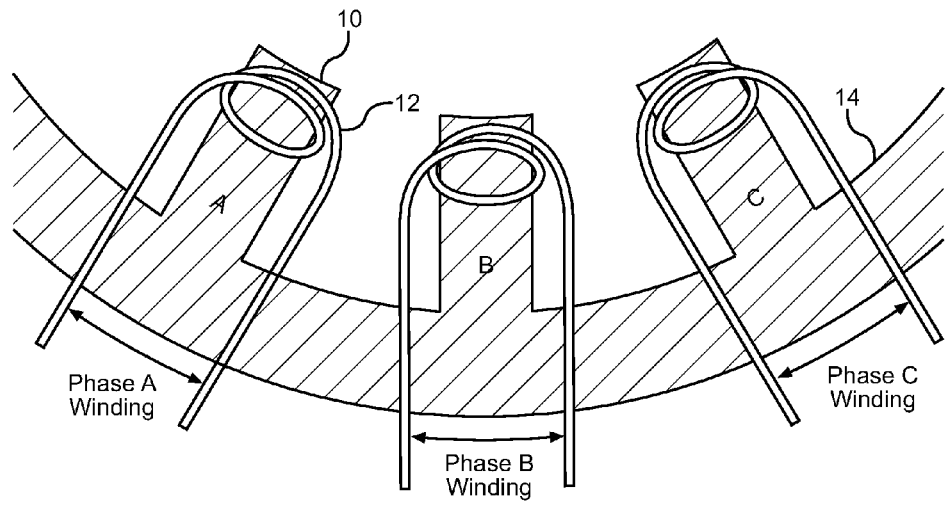
FIG. 2 is a partial cross-sectional view of the prior art structure of FIG. 1.
Figure 3:
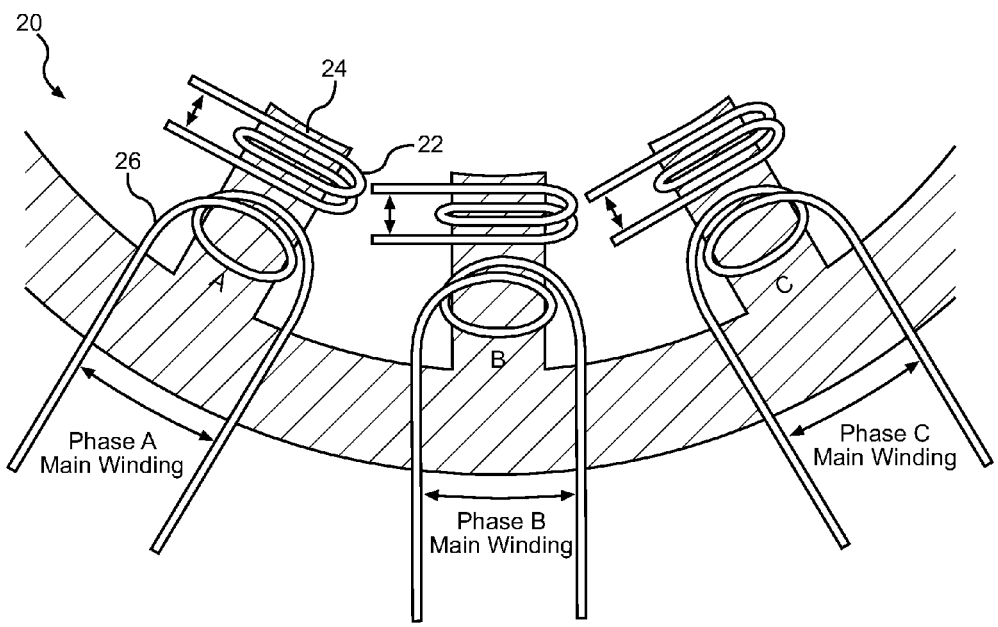
FIG. 3 is a partial cross-sectional view of a PM AC synchronous machine of the present invention.

FIG. 3 shows a partial cross-sectional view of a high voltage permanent magnet (PM) AC synchronous machine 20 of the present invention. In general, the prior art machine of FIGS. 1 and 2 may be structurally modified or adapted for use with the present invention by adding a set of auxiliary phase windings 22 to each tooth 24, separate from the main coils 26, wherein the auxiliary phase windings 22 have a reduced number of turns per coil 22 than the main coils 26. The auxiliary coil set can be easily and safely constructed, requiring very little winding space due to the low number of conductor turns in the auxiliary coils 22. For the actual machine from which this example has been derived, the number of turns per coil in the auxiliary is Ntx=4 turns per coil, while the main set of coils Nt=180 turns per coil. The ratio of voltages induced per phase, auxiliary winding voltage to main winding voltage, due to the rotor magnets alone, is then 4/180=0.022. This much lower operating voltage environment in the auxiliary coil 22 sets is then much better suited to standard electronic signal processing circuitry.

Figure 4:
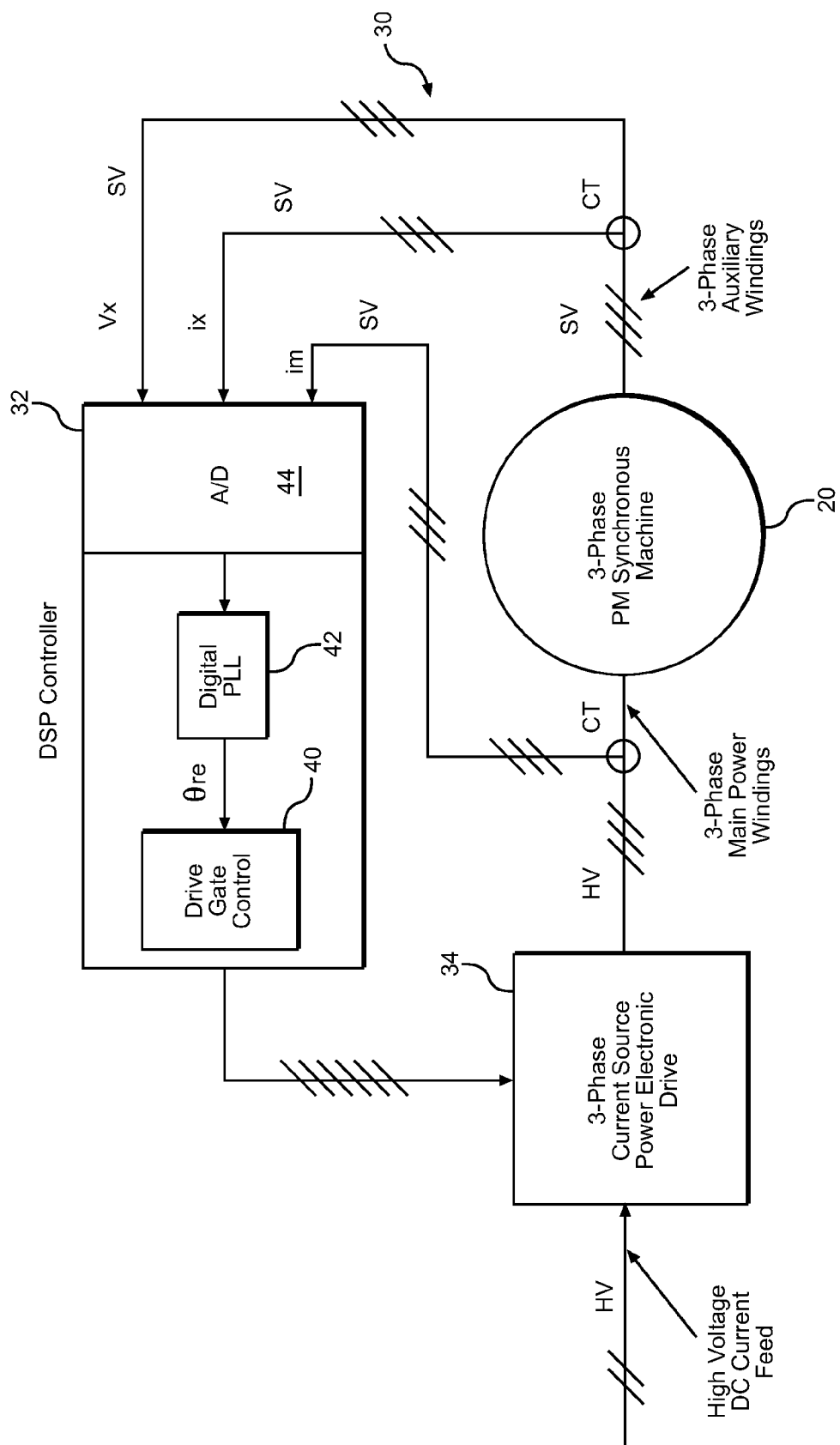
FIG. 4 is an overview of a PM AC synchronous system of the present invention.

Turning to FIG. 4 depicts an overview of a system 30 for determining rotor shaft position of high voltage PM AC synchronous machines of the present invention. As noted above, in an exemplary embodiment, motor 20 is in the form of a 3-phase PM 48 pole machine having 72 stator teeth indicated at 24. System 30 further comprises a digital signal processor (DSP) 32 and a power electronic drive 34 in communication with machine 20. DPS 32 includes a drive gate control 40, a digital phase lock loop (PLL) 42 and an analog to digital converter (A/D) 44. Additionally, a signal voltage level (<±12 volts) is indicated at SV, a high voltage level (<1000 volts) is indicated at HV, current transducers are indicated at CT, and a rotor angle in electrical degrees is indicated at Ore.

In use, motor 20 is placed in an initial starting position and accelerated until a maximum open-loop speed is attained. A sensorless PLL speed calculation is initiated by the DSP when the DSP determines that the maximum open-loop speed has been attained. The maximum open-loop speed is then compared to the PLL speed calculated. When an error rate between the PLL speed and the maximum open-loop speed falls below a predetermined error rate, the system is transitioned to a sensorless mode. The term "sensorless" in the present context should be understood to mean that no mechanical or optical measuring subsystems are employed, and only means for sensing voltage or current are utilized. In the sensorless mode, the DSP is utilized to calculate a motor electrical angular speed utilizing current and voltage measurements from the main set of coils and the auxiliary set of coils.

In addition to using the auxiliary winding set to calculate rotor shaft position, there is a second beneficial use of the auxiliary winding set, which is to economically supply isolated, low voltage power supplies for powering the signal processing and drive control electronics at remote locations of the high voltage machines, by draining very small amounts of main winding set power. This power supply function in no way compromises the primary position sensing function of the auxiliary coils (as will be detailed below). This feature may be particularly useful in certain applications of motor 20 in remote environments. For example, motor 20 of the present invention may be utilized in airborne wind turbines where a source of lower voltage power separate from the high voltage supply is not practical.

Figure 5:
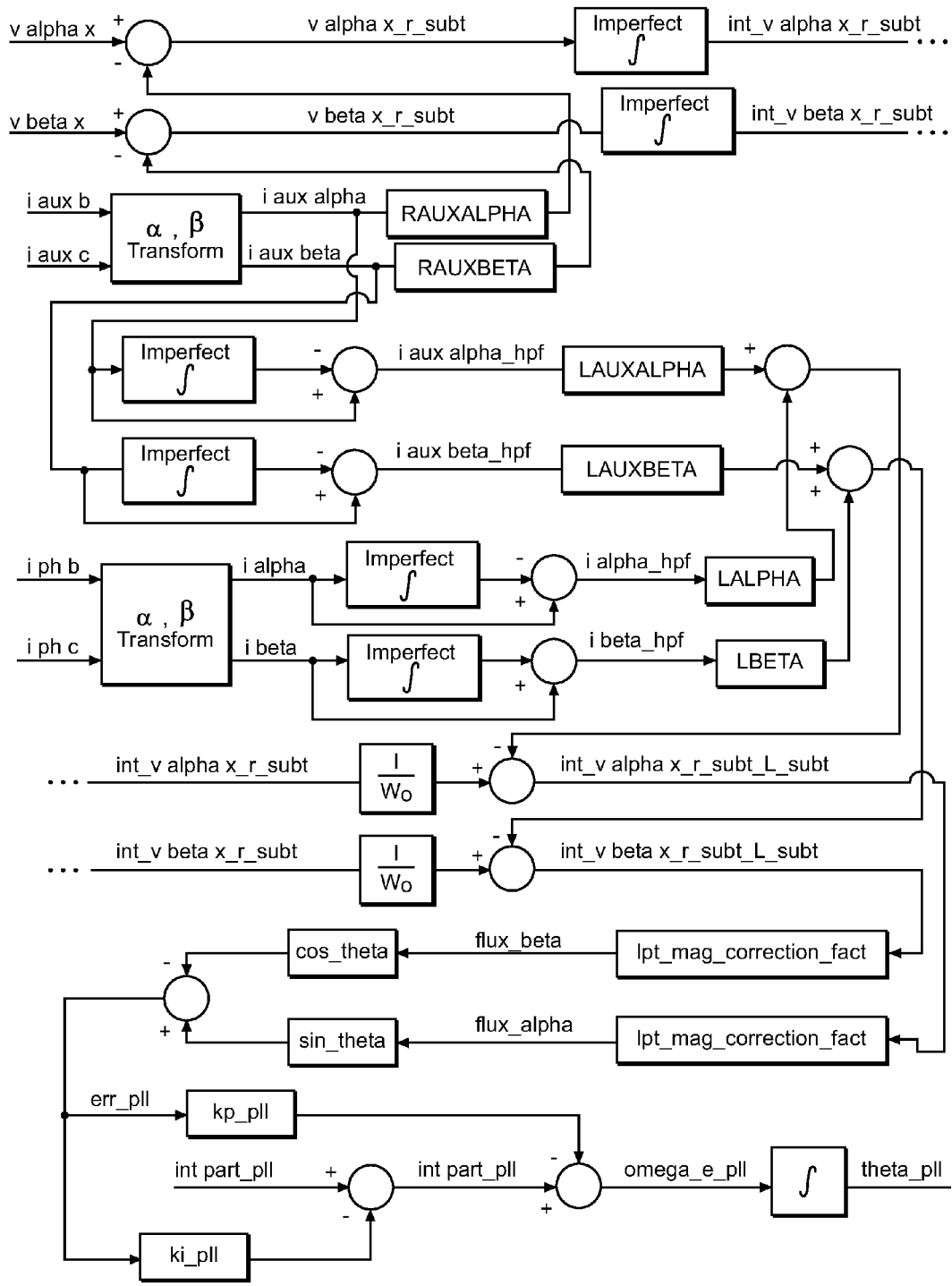
FIG. 5 depicts an algorithm of the present invention.

We now provide a detailed summary of the mathematical steps which must be implemented in the signal processing electronics of a drive controller which utilizes the auxiliary coil method of sensorless rotor position determination of the present invention. Herein the calculation device is generically defined as a digital signal processor (DSP) but in practice most any modern high speed microcontroller device could also be used. The mathematical relations given below can also be described in block diagram format as shown in FIG. 5. The drive considered here is a thyristor based current source drive wherein the DC current supplied to thyristor bridge at the terminals of a 3-phase PM machine is considered a given constant value.

Since we must integrate voltages induced in coils by moving magnets, the sensorless method does not work at zero speed or at very low speeds (the induced voltages would be just too low to be accurately measured). Therefore until adequate speed is attained, another method of driving the motor must be used. This method may in general be referred to as "open-loop", since it does not rely on any feedback from the motor. The first stage in the open-loop drive is a "preposition" stage, where the motor is placed in a known initial position. Next the motor is accelerated, but slowly enough so that it can follow the states that are applied. This acceleration is continued until a maximum open-loop speed is attained, which is sufficient for a transition to sensorless mode.

When the maximum open-loop speed is reached, the DSP instructs the program to start making sensorless calculations; however, the results of these calculations are not yet used to control the motor. This is because the sensorless algorithm relies on the convergence of a phase-locked loop (PLL) to operate properly; therefore an interval of time is allowed for the PLL to converge before making the transition to sensorless control. During this time, the motor is still driven at the maximum open-loop speed. At the start of sensorless calculations, certain program variables are initialized; int_part_pll (the integral part for the PLL speed calculation) and omega_e_pll (the result of the PLL speed calculation) are initialized to omega_e_init, which corresponds to the maximum open-loop speed. Also, theta_pll, the motor angle calculated by the PLL, is initialized to theta_pll_init.

Setting the CALC_FLUX_PLL_BIT tells the DSP to start doing PLL calculations, which it does every motor_pll_calc_count pll interrupts, where a pll interrupt is a defined periodic interrupt process, which regularly occurs with frequency pll_update_frequency, in the specific DSP or processor used to implement the given control algorithm. The variable omega_e_pll stores the results of the speed obtained from the PLL calculation, and theta_pll stores the angle from the PLL calculation. The PLL speed is initialized correctly to the final open-loop speed, however theta_pll is not correct, therefore a transient occurs before theta_pll can lock to the correct angle.

The DSP makes a decision to transition to sensorless mode according to the following criteria. Each time the process_motor_pll subroutine is called from the main loop (approximately every 10 pll interrupts), the DSP checks the error between the speed it has calculated from the PLL calculation, in variable omega_e_pll, and the known correct speed, which is the final open-loop speed, stored in the variable omega_e_transition. The absolute value of this error must stay less than the value delta_omega_transition for at least delta_omega_transition_count consecutive times. (Remember that this counter is incremented every 10 pll counts, or whatever motor_pll_calc_count is set to). When these conditions are satisfied, the DSP transitions to sensorless mode.

The sensorless mode calculations are next described. Basically, we solve the following equivalent two-phase alpha and beta component equations:

$$vauxalpha = R\_AUXALPHA * iauxalpha + L\_AUXALPHA * d(iauxalpha)/dt + L\_ALPHA * d(ialpha)/dt + d(psi * \cos(theta))/dt$$

$$vauxbeta = R\_AUXBETA * iauxbeta + L\_AUXBETA * d(iauxbeta)/dt + L\_BETA * d(ibeta)/dt + d(psi * \sin(theta))/dt$$

where the goal is to solve for the motor flux, psi, and angular position, theta.

In order to solve the above equations, certain quantities must be measured. At least two of the three motor phase currents must be measured; we assume here that the phase b and c currents are measured by the DSP, denoted by variables iphb and iphc. The first step is to transform these currents to ialpha and ibeta:

$$ialpha = -(iphb + iphc)$$

$$ibeta = (iphb - iphc)/\sqrt{3}$$

Similarly, we calculate iauxalpha and iauxbeta for the auxiliary windings using the measured iauxb and iauxc currents:

$$iauxalpha = -(iauxb + iauxc)$$

$$iauxbeta = (iauxb - iauxc)/\sqrt{3}$$

We also measure valphax and vbetax, the alpha and beta voltages at the auxiliary windings. However, we cannot use these voltages directly to calculate flux. First we must subtract out the component of voltage due to the resistance. In the following, R_AUXALPHA, R_AUXBETA are the resistances in the auxiliary windings. We subtract out the resistive components of voltage as follows:

$$valphax\_r\_subt = valphax - R\_AUXALPHA * iauxalpha$$

$$vbetax\_r\_subt = vbetax - R\_AUXBETA * iauxbeta$$

where valphax_r_subt, vbeta_r_subt are variables that store the auxiliary winding voltages with the resistive components subtracted out.

The next step in determining the magnet flux is to subtract out the L di/dt terms from the alpha and beta equations. We know ialpha, ibeta, iauxalpha, and iauxbeta from measurements; however, since these currents appear as derivatives in the equations, we must first integrate valphax_r_subt and vbetax_r_subt. After integration we can then subtract the L*ialpha and L*ibeta terms to obtain the flux terms involving psi.

However, exactly how this integration should be done is not straightforward. It turns out that a simple numerical integration does not work, where values at successive time steps are simply added together. To see why this is, it should first be recalled that we are solving these equations using measured data. Measured data is susceptible to measurement errors and offsets. Imagine that we want to calculate the integral of $\sin(2*pi*t)$, but that our measurement of $\sin(2*pi*t)$ contains both a localized error at one specific time t_0, as well as a dc offset:

$$\sin(2*pi*t) + eps\_0 * \delta(t\_0) + eps\_dc$$

Then we would obtain the following integral:

$$(1 - \cos(2*pi*t))/(2*pi) + eps\_0 + eps\_dc * t$$

Note that the localized error, eps_0, never disappears in the above result. Worse, the dc offset error eps_dc*t keeps getting bigger as time progresses.

To obviate these problems, we use an "imperfect integration" procedure to approximately integrate the voltages. What this procedure amounts to is essentially passing the voltages through a lowpass RC filter. We can implement a lowpass RC filter numerically by the following equation at each time step:

$$vout(t) = vout(t - delt) * (RC/(delt + RC)) + vin(t) * (delt/(delt + RC))$$

where vout is the voltage at the output of the filter (the voltage across the capacitor), and vin is the voltage at the filter input. The above equation shows how to update the filter output at the present time step, using the previous filter output as well as the filter input. If we imagine that valphax_r_subt and vbetax_r_subt are inputs to RC filters, we can use the above algorithm to approximately integrate these voltages. Note that if there is a dc offset in the voltages, a lowpass filter will allow it to appear at the output, but it will not grow in time. Also, since a lowpass filter has a finite memory (due to the resistance R), the eps_0 localized error would eventually disappear from the results of the computation. Note also that the coefficients in the above algorithm always sum to unity.

Therefore, to approximately integrate the voltages, we carry out the following:

$$\text{int\_valpha}x\_r\_subt = \text{INT\_2} * \text{int\_valpha}x\_r\_subt + \text{INT\_1} * \text{valpha}x\_r\_subt$$

$$\text{int\_vbeta}x\_r\_subt = \text{INT\_2} * \text{int\_vbeta}x\_r\_subt + \text{INT\_1} * \text{vbeta}x\_r\_subt$$

where INT_2, INT_1 correspond to the (RC/(delt+RC)) and (delt/(delt+RC)) coefficients in the above lowpass filter algorithm.

Why is this an "approximate" integration method? The phasor response of a lowpass RC filter at frequency omega is:

$$\text{sqrt}(\text{omega\_0}2/(\text{omega}2+\text{omega\_0}**2)) \text{ang}(\arctan(-\text{omega}/\text{omega\_0})),$$

where omega_0=1/(RC) is the radian cutoff frequency of the filter. The response of a true integration is:

$$(1/\text{omega})\text{ang}(-\text{pi}/2).$$

Note that for omega>>omega_0, the lowpass filter response reduces to that of an ideal integration, except for a factor of omega_0. Therefore, if we choose the cutoff frequency of the filter to be much smaller than the motor speeds we expect, then the above numerical method will yield to a very good approximation the true integral at the frequency of interest. Also, we can use the above responses to correct for the approximations made in the integration method.

Once we have obtained int_valphax_r_subt and int_vbetax_r_subt, the next step is to subtract the L*i terms. However, we do not perform this subtraction directly. The reason for this is, as we noted above, that there is some approximation involved in calculating int_valphax_r_subt and int_vbetax_r_subt, due to the "approximate" integration method; the result we calculate will be scaled in magnitude and shifted in phase from the true integral. At a particular frequency omega, which we choose to
correspond to the electrical frequency of the motor, the following is the error in amplitude and phase introduced by the lowpass filter integration method:

$$(\text{omega}*\text{omega\_0})/\text{sqrt}(\text{omega}2+\text{omega\_0}2) \text{ang}((\text{pi}/2)-\arctan(\text{omega}/\text{omega\_0}))$$

(Note that for omega>>omega_0, the above error reduces to just a factor of omega). Before subtracting the L*i terms, it would be ideal if we could introduce this same error into the ialpha and ibeta terms, so that we would be subtracting like quantities.

It turns out that we can introduce exactly the above amplitude and phase errors in the currents, provided that we pass them through the corresponding highpass RC filter. Alternatively, this can be accomplished by first doing the lowpass filter calculation, and then subtracting the filter output from the filter input (this is because the outputs of a first-order lowpass and highpass filter sum to just the input).

Therefore we process the currents as follows:

$$i\text{alpha\_int} = i\text{alpha\_int} * \text{INT\_2} + i\text{alpha} * \text{INT\_1}$$

$$i\text{alpha\_hpf} = i\text{alpha\_int} - i\text{alpha}$$

where ialpha_hpf is the output of the highpass filter, which introduces the same magnitude and phase errors in ialpha as were introduced in int_valphax_r_subt, other than for a factor of omega_0.

Similarly, we process the remaining currents:

$$i\text{beta\_int} = i\text{beta\_int} * \text{INT\_2} + i\text{beta} * \text{INT\_1}$$

$$i\text{beta\_hpf} = i\text{beta\_int} - i\text{beta}$$

$$i\text{auxalpha\_int} = i\text{auxalpha\_int} * \text{INT\_2} + i\text{auxalpha} * \text{INT\_1}$$

$$i\text{auxalpha\_hpf} = i\text{auxalpha\_int} - i\text{auxalpha}$$

$$i\text{auxbeta\_int} = i\text{auxbeta\_int} * \text{INT\_2} + i\text{auxbeta} * \text{INT\_1}$$

$$i\text{auxbeta\_hpf} = i\text{auxbeta\_int} - i\text{auxbeta}$$

At this point, we are ready to subtract out the L*i terms:

$$\text{int\_valpha}x\_r\_subt\_L\_subt = \text{int\_valpha}x\_r\_subt/\text{omega\_0} - i\text{auxalpha\_hpf} * L\text{AUXALPHA} - i\text{alpha\_hpf} * L\text{ALPHA},$$

where LAUXALPHA is the inductance in the alphax auxiliary winding circuit, and LALPHA is the mutual inductance that couples the primary and auxiliary windings.

Similarly:

$$\text{int\_vbeta}x\_r\_subt\_L\_subt = \text{int\_vbeta}x\_r\_subt/\text{omega\_0} - i\text{auxbeta\_hpf} * L\text{AUXBETA} - i\text{beta\_hpf} * L\text{BETA}.$$

At this point int_valphax_r_subt_L_subt and int_vbetax_r_subt_L_subt contain the alpha and beta magnet fluxes, except that we can correct for the magnitude error introduced by the lowpass filter integration method (note that we have already divided by omega_0, and also note that the phase error introduced will be corrected later):

$$\text{lpf\_mag\_correction\_fact} = \text{sqrt}(\text{omega}2+\text{omega0}2)/\text{omega};$$

$$\text{flux\_alpha} = \text{int\_valpha}x\_r\_subt\_L\_subt * \text{lpf\_mag\_correction\_fact},$$

$$\text{flux\_beta} = \text{int\_vbeta}x\_r\_subt\_L\_subt * \text{lpf\_mag\_correction\_fact}$$

flux_alpha is psi*cos(theta) and flux_beta is psi*sin(theta), where theta is the electrical angle of the motor. Although we know the fluxes at this point (except for the phase errors discussed above), we do not yet know the angle theta. We determine the angle using a phase-locked loop.

Let theta denote the true motor angle, and theta_pll denote the approximate angle resulting from the phase-locked loop calculation. We first correct for the phase errors introduced by the lowpass filter calculation as follows:

$$\sin\_\text{theta} = a1*\sin(\text{theta\_pll}) + a2*\cos(\text{theta\_pll}),$$

$$\cos\_\text{thera} = a1*\cos(\text{theta\_pll}) - a2*\sin(\text{theta\_pll})$$

where:

$$a1 = \text{omega}/\text{sqrt}(\text{omega}2+\text{omega0}2),$$

$$a2 = \text{omega0}/\text{sqrt}(\text{omega}2+\text{omega0}2)$$

We then form the following error term:

$$\text{err\_pll} = \text{flux\_alpha}*\sin\_\text{theta} - \text{flux\_beta}*\cos\_\text{theta}$$

Substituting the above expressions for the terms in this equation, it can be shown that this error is the same as:

$$\text{err\_pll} = -\text{psi}*\sin(\text{theta}-\text{theta\_pll})$$

and if theta is close to theta_pll, this is approximately:

err_pll~=−psi*(theta−theta_pll)

Therefore, we can use this error term to make theta_pll converge to the true angle theta, as follows. Let omega_e_pll be the electrical angular speed of the motor, as calculated from the phase-locked loop. Based on the above error we make a correction to omega_e, using a proportional-integral method. The integral part is updated as follows:

int_part_pll=int_part_pll−*ki*_pll*err_pll

Then the updated speed is given by:

omega_*e*_pll=int_part_pll−*kp*_pll*err_pll

When the method converges, the integral part, int_pll, will just be the correct motor electrical angular speed.

(Note that the sign of err_pll is in the proper direction. If theta>theta_pll, it means that the actual position of the motor is ahead of the calculated theta_pll, so that omega_e_pll needs to increase in order for theta_pll to catch up. If theta>theta_pll, err_pll is negative, and since the error terms are subtracted in the proportional-integral calculation, omega_e_pll increases).

From the angular speed omega_e_pll, we can update the electrical angle theta_pll, since it is just the integral of the speed. There are however additional considerations because theta_pll is a normalized angle in 1.15 format (sign bit and 15 fractional bits, 16 bits total, normalized to pi), whereas omega_e_pll is a floating point quantity in radians/sec. The update of theta_pll is carried out in the pll interrupt service routine as follows:

theta_pll=theta_pll+*fp*_to_frac(omega_
  *e*_pll*RECIP_PLL_FREQ_PI), where RECIP_PLL_FREQ_PI is 1/(pll_update_frequency*pi), and the function fp_to_frac( ) converts the quantity in parentheses from floating point to 1.15 integer format.

In sensorless mode, the calculated angle theta_pll is used to select the thyristor states applied in the motor drive. Each electrical cycle is partitioned into six regions, and thyristor states are selected based upon which region theta_pll is located in at any particular time.

Although described with reference to a preferred embodiment of the invention, it should be readily understood that various changes and/or modifications can be made to the invention without departing from the spirit thereof. For instance, the example given here, although from an actual machine which is controlled using the methods of the present invention, is simply an example of one particular type of machine construction. It is not meant to indicate that the methods of the present invention are limited to the construction shown. In general, the invention is only intended to be limited by the scope of the following claims.

We claim:

1. A method for determining rotor shaft position of a permanent magnet AC synchronous machine system including a permanent magnet AC synchronous motor having a stator with a main set of coils and an auxiliary set of coils co-located with the main set of coils about a plurality of stator teeth, wherein each auxiliary coil is wound in the same magnetic configuration as a corresponding coil of the main set of coils, and a drive controller with a digital signal processor, the method comprising:
   placing the motor in predetermined initial position;
   accelerating the motor until a final open-loop speed is attained;
   initiating sensorless phase-locked loop speed calculations via the digital signal processor when the digital signal processor determines that the final open-loop speed has been attained;
   determining an error rate, using the digital signal processor, between a phase-locked loop speed calculated from the phase-locked loop speed calculations and the final open-loop speed;
   when the error rate between the phase-locked loop speed and final open-loop speed falls below a predetermined error rate, transitioning the digital signal processor to a sensorless mode;
   in the sensorless mode, utilizing the digital signal processor to calculate a motor electrical angular speed utilizing current and voltage measurements from the main set of coils and the auxiliary set of coils.

2. The method of claim 1, wherein the main set of coils has Nt turns per coil and the auxiliary set of coils has Ntx turns per coil, where Nt>Ntx.

3. The permanent magnet AC synchronous machine system of claim 2, wherein the main set of coils has 180 turns per coil and the auxiliary set of coils has 4 turns per coil.

4. The permanent magnet AC synchronous machine system of claim 1, wherein the permanent magnet AC synchronous motor includes 48 rotor magnet poles and has 72 stator teeth.

5. The permanent magnet AC synchronous machine system of claim 1, wherein the digital signal processor includes a drive gate control, a digital phase lock loop, and an analog to digital converter.

* * * * *